Aug. 28, 1934.  G. A. TINNERMAN  1,971,881
SPRING FASTENER
Filed Sept. 14, 1933
Fig. 1
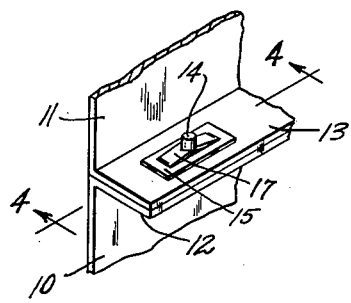
Fig. 2
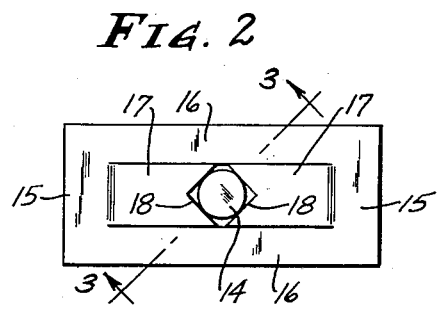
Fig. 3
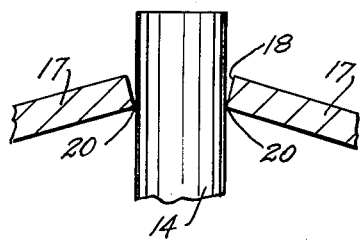
Fig. 5    Fig. 4
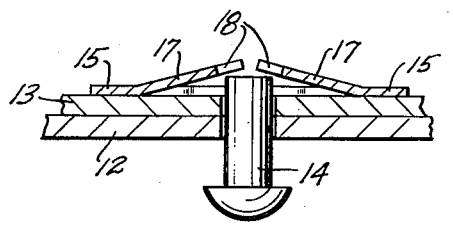 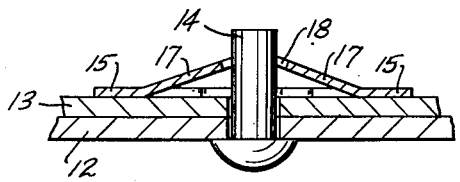
Inventor
George A. Tinnerman
By Bates Golrick + Teare
Attorneys Patented Aug. 28, 1934

1,971,881

UNITED STATES PATENT OFFICE 1,971,881

SPRING FASTENER

George A. Tinnerman, Rocky River, Ohio, assignor to Albert H. Tinnerman, Cleveland, Ohio Application September 14, 1933, Serial No. 689,365

1 Claim. (Cl. 85—36)

This invention relates to fastening devices and particularly to those of the spring type which are used in conjunction with a bolt for holding two or more articles together. Spring fasteners of this type have heretofore been used with threaded bolts, and have comprised a pair of yieldable tongues that engage the threads, and permit the assembly mechanism by an endwise movement of the bolt through the fastener. In such case, the locking action has been obtained by an endwise engagement of the tongues against the threads. The tongues therefore, are usually bent or arched so as to make the ends lie substantially normal to the axis of the bolt. Accordingly, the fastener is limited in use to threaded bolts for the tongues require a shoulder on the coacting part to effect the desired locking action.

It is an object of the present invention to make a fastener, which can be locked against an unthreaded bolt, merely by endwise movement of the bolt through the fastener. An advantage of such construction is the fact that all loose play between the two locking members is eliminated for the bolt can be driven into the fastener to the greatest possible degree in one operation.

When a threaded bolt is used with a spring fastener, it is necessary to give it a few turns after the nut, or fastener has been slipped into place. This is necessary, for in nearly every instance the tongues do not engage the farthest possible thread from the end of the bolt when the bolt is only moved longitudinally. On the other hand, if the bolt is provided with annular shoulders instead of a helical thread, there is the likelihood that the tongues will not engage the shoulders that are most remote from the end of the bolt. This will result in loose play between the articles that are intended to be fastened together. I have found however, that if the tongues of the fastener form a definite relationship to the size of the bolt, and to the base portion of the fastener, the locking action may be accomplished without necessitating the use of shoulders on the bolt. There are important commercial advantages in such construction, for the operation of the threading of the bolt is eliminated, and the necessity for turning the bolt after the fastener has been slipped into place is dispensed with. The invention therefore, not only reduces the cost of material, but also of the labor, which is necessary during the assembly operation.

Referring now to the drawing, Fig. 1 is a perspective view of two articles, which are held together by a fastening device embodying my invention; Fig. 2 is a top plan view of the fastener on an enlarged scale; Fig. 3 is a section on an enlarged scale taken on the line 3—3 in Fig. 2; Fig. 4 is a section taken on an enlarged scale on the line 4—4 in Fig. 1, and Fig. 5 is a sectional view showing the position of the tongues with reference to the base portion when the bolt is passed through the nut.

My invention is intended to hold any two articles together. For the purpose of illustration therefore, I have shown two members 10 and 11, as having flanges 12 and 13 respectively, through which a bolt 14 is adapted to be passed. The head of the bolt bears against the outer surface of the flange 12, while the shank projects beyond the outer surface of the flange 13. The nut or spring fastener bears against the flange 13, and is arranged to receive the shank or bolt and to lock it in place merely by spring tension of the metal of which the nut is made. In its general form the nut has a flat base portion, which comprises end portions 15 that are connected by relatively narrow bridge portions 16. Tongues 17 are struck upwardly from the base and are provided with recessed portions 18 so as to substantially surround the bolt, as is shown in Fig. 2.

The initial set of the tongues is shown in Fig. 5, wherein every part of the surface lies in a common plane, and wherein the angle of inclination of such planes with reference to the base is substantially equal. A further characteristic of the initial formation is the fact that the distance across the tongue recesses at the bolt engaging portions is less than the diameter of the bolt with which the nut is intended to be used. Thus, when a bolt is inserted, as is shown in Fig. 4, the tongues are spread apart, and the lower edges 20 only engage the surface of the bolt. This is shown clearly in Fig. 3.

By positioning the tongues in planes that are inclined at the plane of the base, I obtain a wedge like action on a point or line contact that has been found to be very satisfactory for locking two smooth surfaced members together. I have also found that the parts so joined will not be loosened by vibration and that the tightness of the joint can be increased merely by increasing the pressure with which the bolt is forced onto the nut.

A further important advantage of my invention is the fact that although the nut automatically maintains an effective lock with the bolt, nevertheless it may be removed by inserting a tool under the tongues, and prying them sufficiently loose to permit the bolt to be slid through the nut.

This operation does not damage the nut, and so it may be reused whenever desired.

I claim:—

A spring fastener, comprising a base portion, having end portions and relatively narrow bridge portions extending between the end portions and spaced apart, the nut having a pair of tongues extending upwardly from the end portions and between the bridge portions, each tongue having substantially its entire surface lying in a common plane that is inclined to the plane of the base, and the angle of inclination of the tongues with reference to the base being so chosen that the tongues must be sprung away from the base when a bolt is inserted therethrough, and the tongues operating thereafter to hold the bolt in place solely by a line contact across the lower edge of the tongues and adjacent the ends thereof.

GEORGE A. TINNERMAN.